(12) United States Patent
Saunders et al.

(10) Patent No.: US 11,005,864 B2
(45) Date of Patent: May 11, 2021

(54) FEATURE-AGNOSTIC BEHAVIOR PROFILE BASED ANOMALY DETECTION

(71) Applicant: salesforce.com, inc., San Francisco, CA (US)

(72) Inventors: Matthew Saunders, Alameda, CA (US); Ping Yan, San Francisco, CA (US); John Slater, San Francisco, CA (US); Wei Deng, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 241 days.

(21) Appl. No.: 15/600,562

(22) Filed: May 19, 2017

(65) Prior Publication Data

US 2018/0337937 A1 Nov. 22, 2018

(51) Int. Cl.
  *H04L 29/06* (2006.01)
  *G06F 16/22* (2019.01)
  *G06F 16/23* (2019.01)
  *H04L 12/24* (2006.01)
  *G06N 20/00* (2019.01)

(52) U.S. Cl.
  CPC ...... *H04L 63/1425* (2013.01); *G06F 16/2237* (2019.01); *G06F 16/2365* (2019.01); *H04L 41/142* (2013.01); *H04L 41/145* (2013.01); *G06N 20/00* (2019.01)

(58) Field of Classification Search
  CPC . H04L 63/1425; H04L 41/142; H04L 41/145; G06F 16/2237; G06F 16/2365; G06N 20/00; G06N 5/04; G06N 7/005
  See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

"Detect Security Breaches Early by Analyzing Behavior—Smarter With Gartner". Smarter With Gartner. Jun. 4, 2016. Retreieved Jun. 6, 2016.

(Continued)

*Primary Examiner* — Mohammed Waliullah
(74) *Attorney, Agent, or Firm* — Jaffery Watson Mendonsa & Hamilton LLP

(57) ABSTRACT

Techniques for user behavior anomaly detection. At least one low-variance characteristic is compared to an expected result for the corresponding low-variance characteristics to determine if the low-variance characteristic(s) is/are within a pre-selected range of the expected results. A security response action is taken in response to the low-variance characteristic not being within the first pre-selected range of the expected results. At least one high-variance characteristic is compared to an expected result for the corresponding high-variance characteristics to determine if the high-variance characteristic(s) is/are within a pre-selected range of the expected results. A security response action is taken in response to the high-variance characteristic not being within the first pre-selected range of the expected results. Access is provided if the low-variance and the high-variance characteristics are within the respective expected ranges.

20 Claims, 5 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,881,289 B2 * | 11/2014 | Basavapatna ........... H04L 63/20 726/25 |
| 9,263,036 B1 | 2/2016 | Graves |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2011/0088086 A1 * | 4/2011 | Swink .................. G06F 3/04883 726/7 |
| 2013/0166489 A1 | 6/2013 | Jagota |
| 2016/0112375 A1 * | 4/2016 | Cohen .................. H04L 67/2823 726/12 |
| 2016/0180838 A1 | 6/2016 | Martin et al. |
| 2016/0247061 A1 | 8/2016 | Trask et al. |
| 2016/0299938 A1 | 10/2016 | Malhotra et al. |
| 2016/0350165 A1 * | 12/2016 | LeMond .............. G06F 11/079 |
| 2017/0075519 A1 * | 3/2017 | Kording ................ G06Q 10/06 |
| 2017/0097987 A1 | 4/2017 | Bao et al. |
| 2018/0063168 A1 | 3/2018 | Sofka |

OTHER PUBLICATIONS

A. Ghosh, A. Schwartzbard and M. Schatz, Learning Program Behavior Profiles for Intrusion Detection, 1st USENIX Workshop on Intrusion Detection and Network Monitoring, 1999.

Animesh Patcha, Jung-Min Park, An Overview of Anomaly Detection Techniques, Existing Solutions and Latest Technological Trends, Computer Networks, vol. 51, Issue 12, Aug. 22, 2007, pp. 3448-3470, ISSN 1389-1286.

Bi, Meng, et al., "Anomaly Detection Model of User Behavior Based on Principal Component Analysis." Journal of Ambient Intelligence and Humanized Computing 7.4 (2016): 547-554.

D. Anderson, T. Lunt, H. Javitz, A. Tamaru, and A. Valdes, Next-generation Intrusion Detection Expert System (NIDES): A Summary, SRI-CSL-95-07, SRI International, 1995.

Denning, Dorothy E. "An Intrusion-detection Model." IEEE Transactions on software engineering 2 (1987): 222-232.

Ding, Q., and Kolaczyk, E. D. A Compressed PCA Sub-space Method for Anomaly Detection in High-Dimensional Data. IEEE Transactions on Information Theory 59, 11 (2013).

(56) References Cited

OTHER PUBLICATIONS

Dunn, J. 1973. "A fuzzy relative of the ISO data process and its use in detecting compact well-separated clusters", Journal of Cybernatics, vol. 33, pp. 32-57.
Egele, M., Stringhini, G., Kruegel, C., and Vigna, G. COMPA: Detecting Compromised Accounts on Social Networks. In Proc. of NDSS (2013).
Ghorbani, Wei and Tavallaee. 2010. "Theoretical Foundation of Detection Network Intrusion Detection and Prevention". Concepts and Techniques Advances in Information Security. Springer Science, vol. 47, pp. 47-114.
Ghosh, Anup K., and Aaron Schwartsbard. "A Study Using Neural Newtorks for Anomaly and Misuse Detection." USENIX Security. 1999.
Gilles, C., Melanie, H. and Christian, P.2004. One-Class Support vector Machines with a Conformal kernel A case study in handling class Imbalance. In: Structrual yntactic and Statistical Pattern Recognition.
Guobing, Z., Cuixia, Z. and Shanshan, s.2009. A Mixed Unsupervised Clustering-based Intrusion Detection Model. Third International Conference on Genetic and Eveolutionary Computing.
Jyothsna, V., VV Rama Prasad, and K. Munivara Prasad. "A Review of Anomaly Based Intrusion Detection Systems." International Journal of Computer Applications 28.7 (2011): 26-35.
Li, H 2010. Research and Implementation of an Anomaly Detection Model Based on Clustering Analysis. International Symposium on Intelligent Information Processing and Trusted Computing.
Li, X., Bian, F., Crovella, M., Diot, C., Govindan, R., Iannacone, G., and Lakhina, A. Detection and Identification of Network Anomalies Using Subspaces. In Proc of IMC (2006).
Manocha, S. and Girolami, M. 2007. "An empirical analysis of the probablistic K-nearest Neighbor Classifier", Pattern Recognition Letters, vol. 28, pp. 1818-1824.
Mukkamala, Srinivas, Guadalupe Janoski, and Andrew Sung. "Intrusion Detection Using Neural Networks and Support Vector Machines." Neural Networks, 2002. IJCNN'02. Proceedings of the 2002 International Joint Conference on vol. 2. IEEE, 2002.
Oh, Sang Hyun, and Won Suk Lee. "An Anomaly Intrusion Detection Method by Clustering Normal User Behavior." Computers & Security 22.7 (2003): 596-612.
Ramadas, Manikantan, Shawn Ostermann, and Brett Tjaden. "Detecting Anomalous Network Traffic with Self-Organizing Maps." International Workshop on Recent Advances in Intrustion Detection. Springer Berlin Heidelberg, 2003.
Rawat, S.2005. Efficient Data Mining Algorthims for Intrusion Detection. in Proceedings of the 4th International Journal of Computer Applications (0975-8887) vol. 79—No. 2, Oct. 2013 41 Conference on Engineering of Intelligent Systems (EIS'04).
Rumelhart, D. Hinton, G. and Williams, R. 1986. "Learning internal representations by error propagation". In: Rumelhart, D., McClelland J L et al. (Eds.) Parallel Distributed Processing: Explorations in the Microstructure of Cognition. MIT Press, Cambridge, MA, vol. 1, pp. 318-362.
Tan K M C, Collie B S. Detection and Classification of TCP/IP Network Sevices, Computer Security Applications Conference, 1997. Proceedings, 13th Annual. IEEE, 1997: 99-107.
Viswanath, Bimal, et al. "Towards Detecting Anomalous User Behavior in Online Social Networks." Usenix Security, vol. 14. 2014.
Y. Yao, Wei, Y., Gao, F.X., Yu, G. , "Anomaly Intrusion Detection Approach Using Hybrid MLP/CNN Neural Network," Sixth International Conference on Intelligent Systems Design and Applications (ISDA'06) Washington, DC, USA 2006.
AutoExtend: Extending Word Embeddings to Embeddings for Synsets and Lexemes Rothe et al. (Year: 2015).
Classifying Relations via Long Short Term Memory Networks along Shortest Dependency Paths Xu et al. (Year: 2015).
Deep Bidirectional LSTM based RNN for Casual Speech to Clear Speech conversion Shiwangi Singh (Year: 2017).
Deep Sentence Embedding Using Long Short-Term Memory Networks: Analysis and Application to Information Retrieval Palangi et al. (Year: 2016).
Easy-First Dependency Parsing with Hierarchical Tree LSTMs Kiperwasser et al. (Year: 2016).
End-to-End Relation Extraction using LSTMs on Sequences and Tree Structures Miwa et al. (Year: 2018).
Non-Final Office Action for U.S. Appl. No. 15/665,926 dated Sep. 29, 2020, 16 pages.
Unidirectional Long Short-Term Memory Recurrent Neural Network With Recurrent Output Layer for Low-Latency Speech Synthesis, Zen et al. (Year: 2015).

\* cited by examiner

FEATURE-AGNOSTIC BEHAVIOR PROFILE BASED ANOMALY DETECTION

TECHNICAL FIELD

Embodiments relate to electronic data security. More particularly, embodiments relate to techniques for monitoring accesses to electronic data/resources to identify patterns that indicate an attack.

BACKGROUND

Data/resource security is a wide-ranging problem for nearly all users of electronic devices. Many strategies have been developed for detection of attacks. However, these strategies are generally reactive in that detection and/or correction only occurs after attacks have occurred. Thus, using traditional techniques, data/resources are exposed to novel attack vectors.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
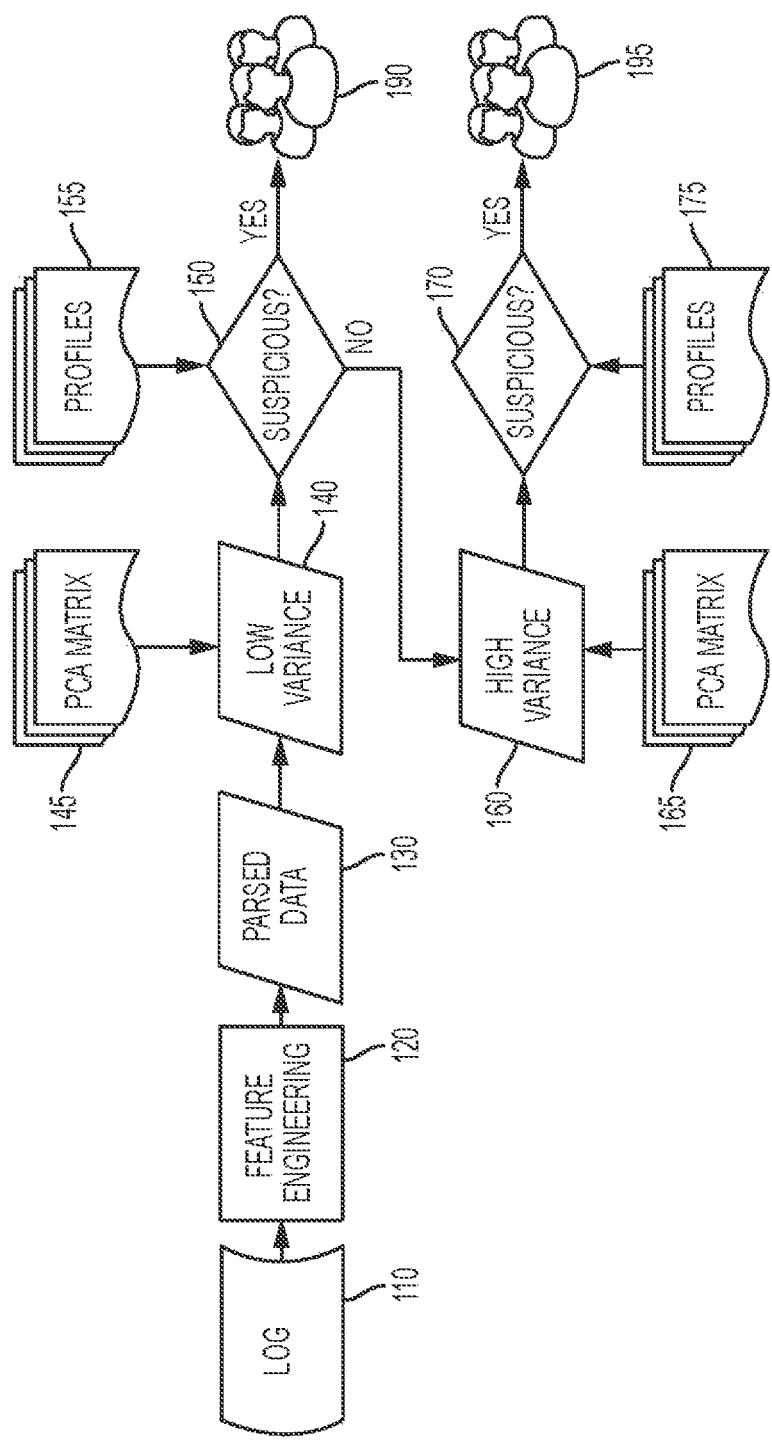
FIG. 1 provides a conceptual illustration of one embodiment of a detection architecture.

In the following description, numerous specific details are set forth. However, embodiments of the invention may be practiced without these specific details. In other instances, well-known structures and techniques have not been shown in detail in order not to obscure the understanding of this description.

Described herein is an architecture that can provide a real-time, scalable, large-scale, low false positive, personalized anomaly detection system. Anomaly detection for user behavior at the application layer at a large (e.g., terabyte) scale is extremely challenging. Traditional techniques such as clustering methods suffer serious production performance issues. In one embodiment, the method described herein operates through three phases.

In a first phase, Principal Component Analysis (PCA) techniques can be utilized to extract high-variance and low-variance feature subsets. The low-variance feature subset can contain strong indicators of anomalous behavior when, for example, actions deviate from a user's prior behavior. The high-variance feature subset can be utilized to provide dimension reduction (as compared to raw features).

In one embodiment, in a second phase, on each feature subset, using historical data, a profile is built for each user to characterize the user's baseline normal behavior as well as legitimate abnormal behaviour.

In one embodiment, in a third (detection) phase, real-time behavior events can be compared with the user's profile to produce an anomaly score. The computation complexity of the detection module for each incoming event is constant. As described in greater detail below, the innovative anomaly detection technique is able to detect generic malicious behavior of unknown and advanced targeted attacks, is a real-time personalized model, and is highly scalable in terms of the magnitude of both data volume and feature space dimension.

Computing platforms, for example, cloud computing environments are increasingly vulnerable to advanced targeted attacks. Statistical anomaly detection and machine learning techniques can be employed to address more sophisticated and unknown security threats; however, many such techniques are applied to monitor the network traffic or program behavior on computer systems.

User application layer activities, on the other hand, demonstrate unique characteristics and different variability compared to the network or system level traffic. While a software application has access to the complete context of an interaction and enhanced information about each of its users, it is a challenge to differentiate between a high-value issue and noise due to the complex application logic. However, modern day software applications often reside on multi-tenant, cloud-based platforms. While they provide unique data mining opportunities for information security problems, a generic yet personalized solution is desired as each user or user's organization comes with their own environments and contexts.

For example, in a multitenant cloud-based platform, all enterprise customers share the same infrastructure and the same version of the platform. Various embodiments of an on-demand services environment that can be a cloud-based multitenant environment are described in greater detail below. As used herein, an "organization" is a standalone enterprise customer, a tenant on the multitenant platform and a "user" corresponds to an individual user account.

An organization includes a group of users who share a common access with specific privileges to a software instance. A multi-tenant architecture provides an organization with a dedicated share of the software instance typically including one or more of organization-specific data, user management, organization-specific functionality, configuration, customizations, non-functional properties, associated applications, etc. Multi-tenancy contrasts with multi-instance architectures, where separate software instances operate on behalf of different organizations.

Anomaly detection on user in-app behavior at a large scale is extremely challenging because there is limited labeled data available to train supervised learning models and traditional unsupervised learning techniques like clustering methods suffer from serious production performance issues.

To overcome these performance issues, described herein is an adaptive anomaly detection approach based on Principal Component Analysis (PCA). With these techniques, a host system can detect generic anomalous behavior of unknown and advanced targeted attacks, and train one or more models over each individual user for real-time personalized detection.

PCA is a classical tool for dimension reduction, and plays a central role in multivariate statistics and data mining. PCA based anomaly detection techniques first extract the primary trends and patterns in data and then monitor for departures. In various embodiments, utilizing a PCA framework, revolve around a relatively fine scale of individual users on a cloud-based multitenant platform that can accommodate tens of millions of users.

Anomaly detection has been applied in network intrusion detection to cope with unknown attacks. These approaches operate on lower levels of network traffic at the packet, or HTTP/TCP level. Other detection systems monitor user operating system (OS) logs to detect anomalous events at the system level. However, these anomaly-based intrusion detection approaches are prone to generating false positives due to the ever-changing nature of networks, which reduces their effectiveness.

User application layer activities demonstrate unique characteristics and different variability compared to network or system level traffic. Unlike all traditional methods, the techniques described herein achieve both low false positive rate and real time production performance through building personalized profiles for each user, which incorporate three pieces of information: 1) user's baseline behavior, a Median (M), 2) variance of user's data, Median Absolute Deviation (MAD), and 3) user's abnormal behavior, Median of Abnormality (MoA).

These three statistics can be utilized to represent a distribution of the user's historical behavior. With the learned distribution, a deviation for new activities can be calculated by comparing with user's profile to get a Relative Deviation (RD). In one embodiment, a Correction Factor (CF) can be computed that encodes the geometric relationship between the incoming activity and user's profile, to determine if the user's behavior is truly anomalous. The correction factor can increase or decrease RD to generate robust anomaly scores.

In one embodiment, the detection system relies on application logs as input to provide and utilize a user-profiling module and an anomaly-detection module. The log files can be maintained with, for example, Apache Spark, which is an open-source cluster-computing framework. Other architectures can also be utilized.

FIG. 1 provides a conceptual illustration of one embodiment of a detection architecture. In one embodiment, the detection functionality is provided by one or more entities within a cloud-based environment, for example, an on-demand services environment that can include a multitenant database. Various embodiments of on-demand service environments are described in greater detail below.

In one embodiment, the detection architecture functions to scan users' current activity to detect any malicious behavior. In one embodiment, the detection architecture can load a PCA mapping matrix and profiles built with the profiling architecture described below and compares them with incoming events to generate anomaly scores.

Conceptually, the detection architecture can be considered a chain structure. In one embodiment, feature engineering module 120 operates on log data 110 to generate parsed data 130. In one embodiment, log data is first mapped into low-variance projected directions 140 using PCA matrix 145 to determine if the user has deviated from his/her stable behavior. For example, if the user has not changed his IP address in the past, but suddenly switches to a new IP address, that could constitute a low-variance anomaly of interest.

The low-variance analysis is focused on conditions/events that happen relatively infrequently for a specific user. Other examples of low-variance characteristics include, for example, device operating system type (e.g., Windows®, MacOS®, Linux), hardware computing device being used (e.g., device address, device identifier, processor identifier), etc. Other types of low-variance characteristics and conditions can also be utilized.

Results from low-variance analysis 140 (using PCA matrix 145) can be compared with one or more profiles 155 to determine if any of the behaviors are considered suspicious, 150. If the behavior is suspicious, 150, one or more actions can be taken, 190, which can include, for example, providing notifications to one or more parties, limiting access, blocking the user account, etc. If the behavior is not considered suspicious, 150, a high-variance analysis can be performed.

In one embodiment, after passing through detection for low-variance projected directions (e.t., 140, 145), the original data (e.g., parsed data 130) can projected into high-variance directions 160 for another deviation check. High-variance directions are representative of original dimensions, which explain most variance inside data.

Figure 2:
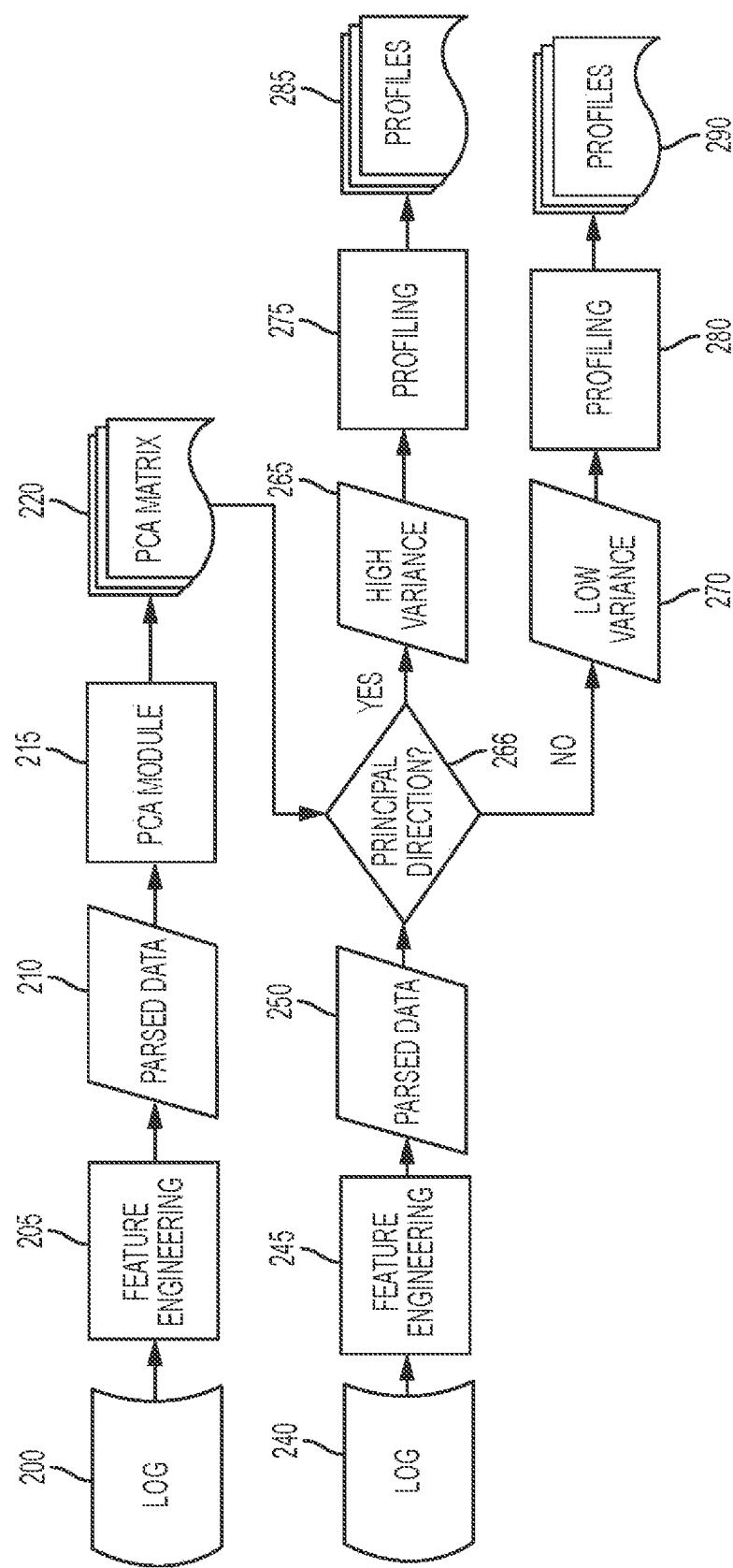
FIG. 2 provides a conceptual illustration of one embodiment of a profiling architecture.

FIG. 2 provides a conceptual illustration of one embodiment of a profiling architecture. In one embodiment, the profiling functionality is provided by one or more entities within a cloud-based environment, for example, an on-demand services environment that can include a multitenant database.

In one embodiment, the profiling module functions is to scan the most recent log history to aggregate statistics for characterizing user behavior. In one embodiment, it can run over hundreds of terabytes of data to build PCA mapping matrices at the organization level (in a multitenant environment) and users' profiles for each extracted feature set. In one embodiment, the PCA matrix is used for feature extraction (e.g. selecting high-variance and low-variance directions), which can be utilized as discussed above. In one embodiment, profiles are built for each feature subset. Profiles can be refreshed periodically to keep the users' most recent behavior.

In one embodiment, log data 200 is parsed by feature engineering agent 205 to generate parsed data 210, which can be analyzed by PCA module 215 to generate one or more PCA matrices 220. Similarly, log data 240 can be parsed by feature engineering agent 245 to generate parsed data 250.

Feature selection can be challenging when there is limited feedback, thus this can be a bottleneck to scaling feature detection. In one embodiment, instead of selecting the optimum feature set towards any specific kinds of attacks, the focus can be on differentiating between the user's normal and anomalous behavior. For such a purpose, PCA can be leveraged to extract two categories of feature set, a high-variance subset (used as a representative of original data set, which serves the traditional purpose of dimension reduction), and a low-variance subset (that demonstrates the user's stable behavior). If novelty appears along these directions, it should trigger a high anomaly score and have the highest priority for investigation.

In a multitenant environment, for example, feature selection for each organization can be provided to extract high-variance and low-variance feature subsets. Global feature selection with one PCA mapping matrix can be too coarse to retain the intrinsic behavior of an individual organization, while user-level feature selection can be too granular, bringing a huge computational challenge considering the large number of user accounts that can exist and also has a cold-start problem.

In one embodiment, for the high-variance feature set, the top N dimensions that represent at least 90% of total variance can be selected. Other and/or different high-variance parameters can be used, for example, the top N dimensions that represent 95% of the total variance or use of one or more specified high-variance dimensions. In one embodiment, for the low-variance feature set, the lowest M dimensions which represent no more than 5% of total variance can be selected. Other and/or different low-variance parameters can be used, for example, the lowest M dimensions that represent 10% of the total variance or use of one or more specified low-variance dimensions. Detection models can be built for each feature set, for use with the detection architecture that can run in a sequenced mode.

In one embodiment, using one or more of PCA matrices 220 and parsed data 250, the profile module can determine whether the behavior/dimension is to be classified as high variance (265) or as low variance (270). In one embodiment, as a result of this analysis a selected behavior/dimension can be excluded from analysis by not being considered high variance or low variance (this option is not illustrated in FIG. 2). For the high-variance behaviors/dimensions, 265, profiling module 275 generates one or more profiles 285 to be used by the detection architecture as discussed above. Similarly, for the low-variance behaviors/dimensions, 270, profiling module 280 generates one or more profiles 290 to be used by the detection architecture as discussed above.

In one embodiment, with vectors in reduced dimension, three statistics are computed to characterize an individual user's behavior: Median is a vector in reduced dimension representing the user's baseline behavior; Median Absolute Deviation (MAD) is a real positive number describing variation of the user's behavior; Median of Abnormality is a vector in reduced dimension representing the user's legitimate abnormal behavior.

In one embodiment, for each user a baseline behavior is constructed by determining:

$$\bar{p} = \min_{p_l} \sum_{k=1}^{N} d(p_k, p_l)$$

Where N is the number of the user's data points, $p_k$ is an individual data point and the distance function d is a $L_2$ norm function. The user's data points may not be evenly distributed. The optimum of the equation above leans more towards high-density area, thus is robust to outliers. In alternate embodiments, other techniques can be utilized to determine user baseline behavior.

In one embodiment, in addition to baseline a variance of distribution is determined in multidimensional space (the Median Absolute Deviation, or MAD). In one embodiment:

MAD=mid$\{d(p_k,\bar{p})\}$

Where $p_k$ is an individual data point.

In one embodiment, a statistical measure is computed to characterize the user's legitimate abnormal behavior. This statistical measure functions to reduce the false positive rate. In one embodiment, for data points with large deviation, however if it is similar to abnormality observed previously, the associated anomaly score can be lowered.

In one embodiment, a "Median of Abnormality" (MoA) is computed through two steps. In one embodiment, the first step involves collecting Relative Deviation (RD), of each data with following equation $$RD_k = \frac{1}{1 + \frac{MAD}{d(p_k, \bar{p})}}, \text{ where } p_k \neq \bar{p}$$

In one embodiment, the second step involves selecting data set S, in which the relative deviation of data points is above pre-defined threshold a, and compute median in S in the same way as described above, which is set as the median of abnormality for the user, $\hat{p}$.

$$\min_{p_l} \sum_{k=1}^{N} d(p_k, p_l)$$

Where M is size of set S, $p_k$ is an individual data point in S, and the distance function d is $LL_2$ norm function.

In summary, with values in reduced dimension and associated profiles, an anomaly value can be determined for a user's new activities. For any incoming user's activity, that activity can be mapped it to a low dimension vector, p to compute relative deviation, RD, as discussed above. However, large RD does not necessarily indicate a threat. In one embodiment, a correction factor encoding geometry relationship among new activity, user's median, and the user's Median of Abnormality, to determine if the user faces a real threat. In one embodiment, the correction factor can increase or decrease RD to generate a valid anomaly score. A large correction factor can indicate deviation in both magnitude and direction.

Figure 3:
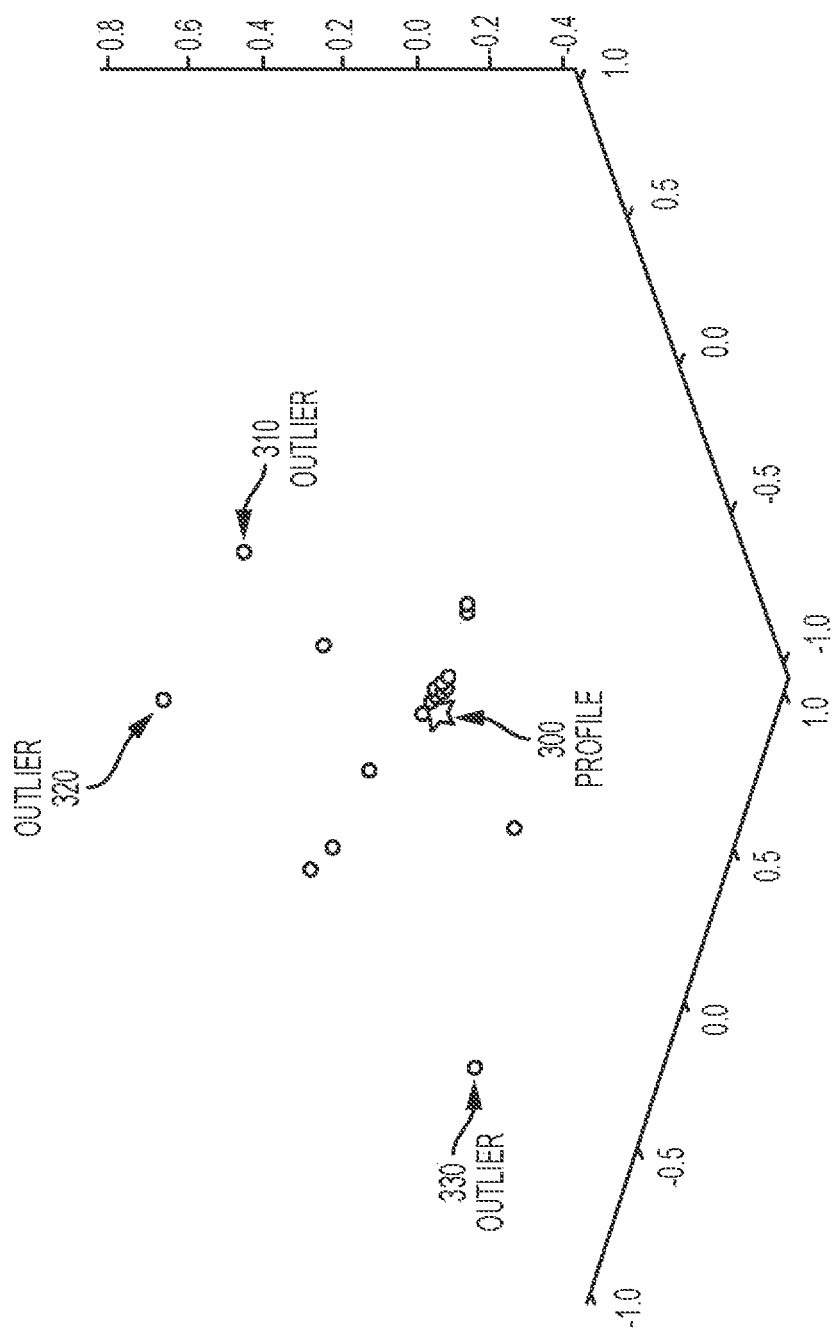
FIG. 3 provides a conceptual illustration of one embodiment of a profile analysis result.

FIG. 3 provides a conceptual illustration of one embodiment of a profile analysis result. In the example of FIG. 3, example profile 300 indicates a "normal" behavior for a user. The various dots in FIG. 3 correspond to evaluated behaviors for the user of profile 300. In the example of FIG. 3, behaviors 310, 320 and 330 indicate enough of a deviation from profile 300 to be considered outliers. These behaviors can cause a threat evaluation and/or reaction in the host system.

As discussed above, the detection, profiling and monitoring techniques described above can be utilized in an on-demand services environment. These on-demand services environments can be part of multitenant environments in which users from many different tenants/organizations can monitored utilizing the techniques described herein so that multiple tenants/organizations can benefit from the advantages provided.

Figure 4:
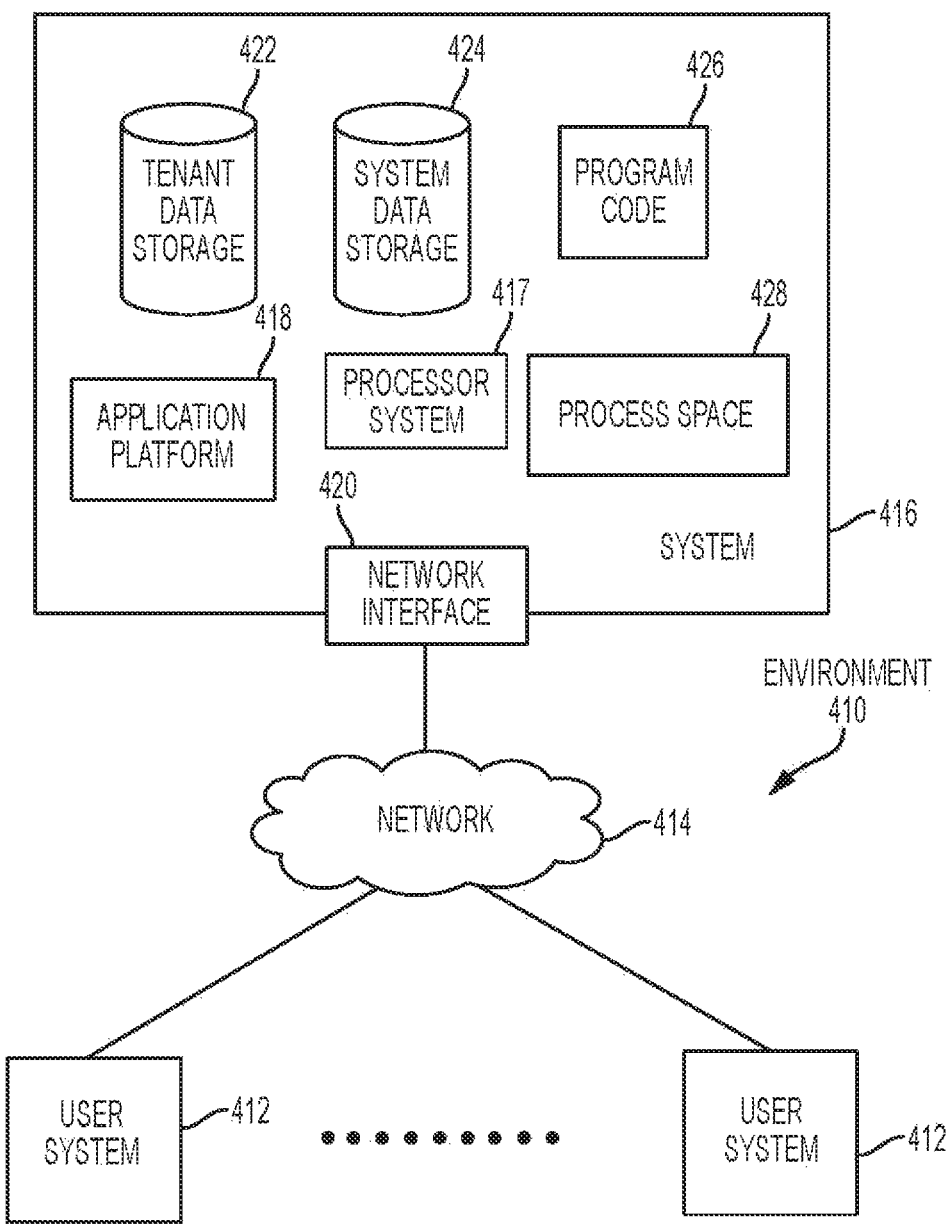
FIG. 4 is a block diagram of one embodiment of an on-demand services environment that can utilize the detection architecture described herein.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Core series processor or the like. Similarly, system 416 (and additional instances of an MTS, where more than one is present) and all of their components might be operator configurable using application(s) including computer code to run using a central processing unit such as processor system 417, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
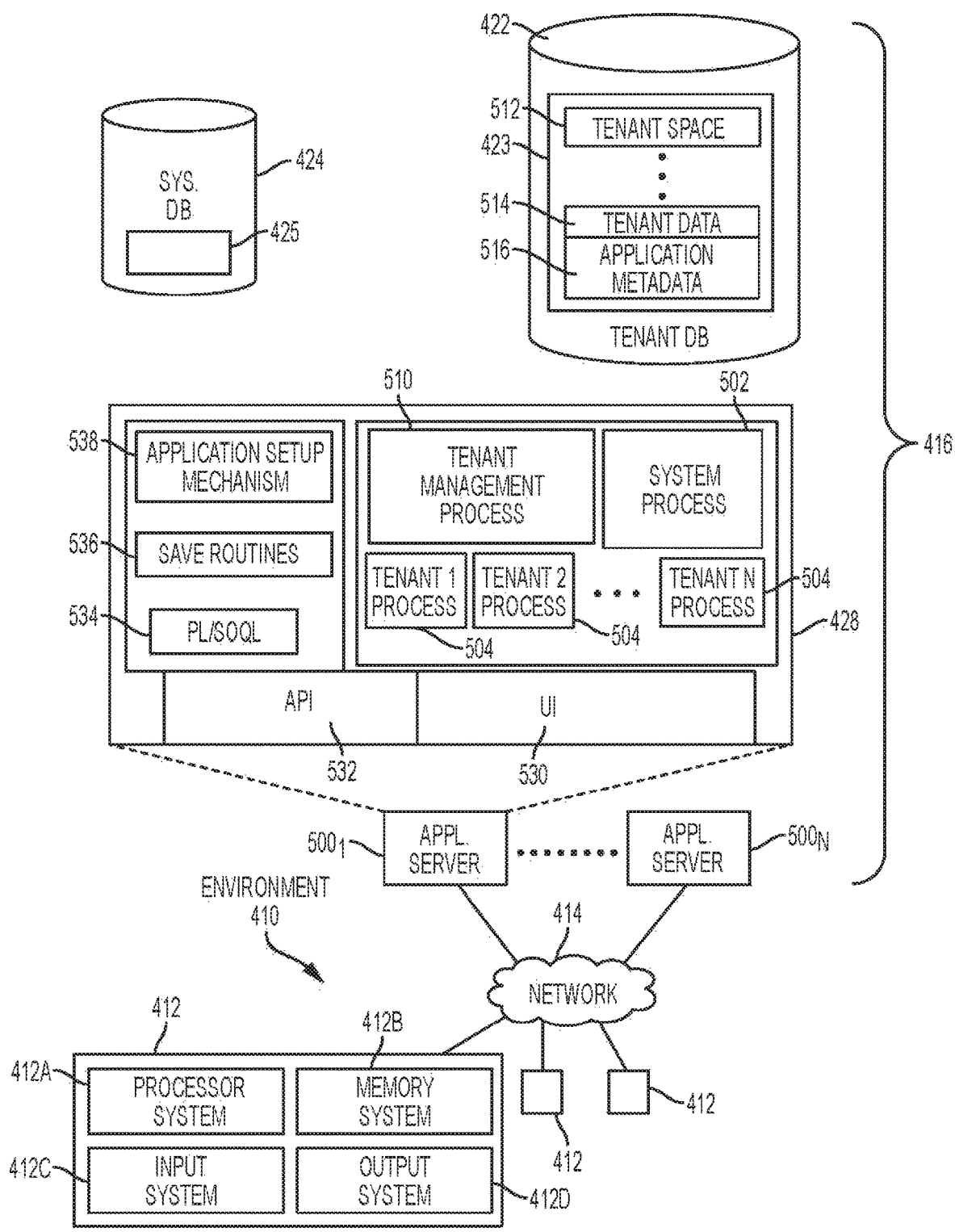
FIG. 5 is a block diagram of one embodiment of an on-demand services environment that can utilize the detection architecture described herein.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers 5001-400N, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server 500₁ might be coupled via the network 414 (e.g., the Internet), another application server 500N-1 might be coupled via a direct network link, and another application server 500N might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 BIG-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention.

The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    determining at least one low-variance characteristic corresponding to a user of an electronic device used to access a resource provided via a secure environment, wherein low-variance characteristics correspond to events and conditions that occur relatively infrequently for the user;
    comparing the at least one low-variance characteristic to an expected result for the corresponding one or more low-variance characteristics, wherein the expected result is based on a user profile that incorporates, for each of the one or more low-variance characteristics, a user baseline median behavior, an expected variance of user behavior, and a user abnormal behavior threshold;
    determining at least one high-variance characteristic corresponding to the user if the at least one low-variance characteristic is within the expected variance of user behavior;
    taking a first security response action in response to the at least one low-variance characteristic not being within the expected variance of user behavior;
    comparing the at least one high-variance characteristic to an expected result for the corresponding one or more high-variance characteristics, wherein the at least one high-variance characteristic is utilized to provide dimension reduction as compared to raw features;
    allowing access to the resource provided via the secure environment if the at least one high-variance characteristic is within a pre-selected acceptable range of the expected results; and
    taking a second security response action in response to the at least one high-variance characteristic not being within the pre-selected acceptable range of the expected results.

2. The method of claim 1 wherein the at least one low-variance characteristics comprise one or more of: the electronic device operating system and a hardware computing device being used.

3. The method of claim 1 wherein the at least one low-variance characteristics comprise at least a user identity corresponding to the low-variance characteristics.

4. The method of claim 1 wherein the low-variance characteristics comprise a lowest M dimensions that represent no more than a pre-selected percentage of total variance.

5. The method of claim 1 wherein the high-variance characteristics comprise a top N dimensions that represent pre-selected percentage of total variance.

6. The method of claim 1 wherein the resource is provided from within an on-demand services environment.

7. The method of claim 6 wherein the on-demand services environment comprises at least a multitenant database environment in which the multitenant database environment provides each of multiple organizations with a dedicated share of a software instance including one or more of organization-specific data, user management, organization-specific functionality, configuration, customizations, non-functional properties and associated applications.

8. A non-transitory computer-readable medium having stored thereon instructions that, when executed by one or more processors, are configurable to cause the one or more processors to:
    determine at least one low-variance characteristic corresponding to a user of an electronic device used to access a resource provided via a secure environment, wherein low-variance characteristics correspond to events and conditions that occur relatively infrequently for the user;
    compare the at least one low-variance characteristic to an expected result for the corresponding one or more low-variance characteristics, wherein the expected result is based on a user profile that incorporates, for each of the one or more low-variance characteristics, a user baseline median behavior, an expected variance of user behavior, and a user abnormal behavior threshold;
    determine at least one high-variance characteristic corresponding to the user if the at least one low-variance characteristic is within the expected variance of user behavior;
    take a first security response action in response to the at least one low-variance characteristic not being within the expected variance of user behavior;
    compare the at least one high-variance characteristic to an expected result for the corresponding one or more high-variance characteristics, wherein the at least one high-variance characteristic is utilized to provide dimension reduction as compared to raw features;
    allow access to the resource provided via the secure environment if the at least one high-variance characteristic is within a pre-selected acceptable range of the expected results; and
    take a second security response action in response to the at least one high-variance characteristic not being within the pre-selected acceptable range of the expected results.

9. The non-transitory computer-readable medium of claim 8 wherein the at least one low-variance characteristics comprise one or more of: the electronic device operating system and a hardware computing device being used.

10. The non-transitory computer-readable medium of claim 8 wherein the at least one low-variance characteristics comprise at least a user identity corresponding to the low-variance characteristics.

11. The non-transitory computer-readable medium of claim 8 wherein the low-variance characteristics comprise a lowest M dimensions that represent no more than a pre-selected percentage of total variance.

12. The non-transitory computer-readable medium of claim 8 wherein the high-variance characteristics comprise a top N dimensions that represent pre-selected percentage of total variance.

13. The non-transitory computer-readable medium of claim 8 wherein the resource is provided from within an on-demand services environment.

14. The non-transitory computer-readable medium of claim 13 wherein the on-demand services environment comprises at least a multitenant database environment in which the multitenant database environment provides each of multiple organizations with a dedicated share of a software instance including one or more of organization-specific data, user management, organization-specific functionality, configuration, customizations, non-functional properties and associated applications.

15. A system comprising:

a memory device;

one or more hardware processors coupled with the memory device, the one or more hardware processors configurable to determine at least one low-variance characteristic corresponding to a user of an electronic device used to access a resource provided via a secure environment, wherein low-variance characteristics correspond to events and conditions that occur relatively infrequently for the user, to compare the at least one low-variance characteristic to an expected result for the corresponding one or more low-variance characteristics, wherein the expected result is based on a user profile that incorporates, for each of the one or more low-variance characteristics, a user baseline median behavior, an expected variance of user behavior, and a user abnormal behavior threshold, to determine at least one high-variance characteristic corresponding to the user if the at least one low-variance characteristic is within the expected variance of user behavior, to take a first security response action in response to the at least one low-variance characteristic not being within the expected variance of user behavior, to compare the at least one high-variance characteristic to an expected result for the corresponding one or more high-variance characteristics, wherein the at least one high-variance characteristic is utilized to provide dimension reduction as compared to raw features, to allow access to the resource provided via the secure environment if the at least one high-variance characteristic is within a pre-selected acceptable range of the expected results, and to take a second security response action in response to the at least one high-variance characteristic not being within the pre-selected acceptable range of the expected results.

16. The system of claim 15 wherein the at least one low-variance characteristics comprise one or more of: the electronic device operating system and a hardware computing device being used.

17. The system of claim 15 wherein the at least one low-variance characteristics comprise at least a user identity corresponding to the low-variance characteristics.

18. The system of claim 15 wherein the low-variance characteristics comprise a lowest M dimensions that represent no more than a pre-selected percentage of total variance.

19. The system of claim 15 wherein the high-variance characteristics comprise a top N dimensions that represent pre-selected percentage of total variance.

20. The system of claim 15 wherein the resource is provided from within an on-demand services environment, wherein the on-demand services environment comprises at least a multitenant database environment in which the multitenant database environment provides each of multiple organizations with a dedicated share of a software instance including one or more of organization-specific data, user management, organization-specific functionality, configuration, customizations, non-functional properties and associated applications.

* * * * *